May 14, 1963 G. D. BRUCE ETAL 3,089,964

INVERTER WITH OUTPUT CLAMP AND R-C CIRCUIT

Original Filed Sept. 30, 1954

INVENTORS
GEORGE D. BRUCE
ROBERT A. HENLE

BY Lester H. Clark

ATTORNEY 3,089,964

INVERTER WITH OUTPUT CLAMP AND R-C CIRCUIT

George D. Bruce, Poughkeepsie, and Robert A. Henle, Hyde Park, N.Y., assignors to International Business Machines Corporation, New York, N.Y., a corporation of New York Original application Sept. 30, 1954, Ser. No. 459,322, now Patent No. 2,891,172, dated June 16, 1959. Divided and this application May 22, 1959, Ser. No. 815,174
3 Claims. (Cl. 307—88.5)

This application is a division of our co-pending application Serial No. 459,322, filed September 30, 1954, now U.S. Patent No. 2,891,172, granted June 16, 1959.

This invention relates to switching circuits employing junction transistors, and especially to switching circuits which are useful in high speed digital computers.

A switching circuit may be defined as a circuit wherein changes in the impedance between output terminals take place suddenly, with accompanying current and potential changes, as a result of changes in the impedance of a translating device, e.g., a vacuum tube or a transistor, connected in the circuit.

A junction transistor consists of a body of semi-conductive material having a central region in which one type of current carrier structure predominates (commonly the predominating carriers in the central region are electrons and the material is spoken of as N-type), and two end regions, wherein the other common type of current carrier structure predominates (the other common type of current carrier is termed a "hole" and the semi-conductive material in those end portions is called P-type material). A base electrode is in electrically conductive contact with the central region, and emitter and collector electrodes are in contact with the respective end regions.

Junction transistors are to be contrasted with point contact transistors, which employ a body which is uniformly of N- or P-type material, with two contacts (emitter and collector electrodes) and one wide area contact (base electrode) engaging the body. Junction transistors are more stable than point contact transistors. Their characteristics are more nearly linear and do not change as much with time or with temperature variations. Furthermore, their current-carrying capacity is greater than that of point contact transistors.

High speed digital computers commonly work with a series of pulses of electric current or potential, each pulse representing a digit. The pulses used may be square wave pulses or peaked wave pulses. It is desirable to employ in such computers circuits which will not distort the pulses. In other words, the output waves should be just as square or just as peaked as the input waves. It is also desirable to have the signal pulses fixed as to their potential or current magnitude.

It is sometimes desirable in such a computer to invert a square wave. Specifically, it may be desired to connect a first circuit having a normal negative output potential on which are superimposed positive square wave signal pulses to a second circuit which utilizes a normally positive input potential with superimposed negative square wave pulses. In such a case it is necessary to invert the signals from the first circuit, i.e., reverse the polarities of their potentials, before impressing them on the second component circuit. A circuit which performs such an inverting operation is commonly referred to as an inverter circuit.

The present invention is directed to circuits employing junction transistors and which may be employed as inverter circuits.

An object of the invention is to provide circuits of the type described having improved characteristics as to the wave form and magnitude of the output pulses.

A further object of the invention is to provide improved circuits of the type described employing junction transistors.

The foregoing and other objects of the invention are attained herein through the use of a basic circuit which itself functions as an inverter circuit. This inverter circuit utilizes a junction transistor, with a grounded emitter and a signal input into the base. Means are provided biasing the base to a potential which tends to hold the transistor cut off. In a typical circuit, a PNP transistor is used and the base is biased positively with respect to the emitter. The input signal has a negative background value which overcomes the positive bias and makes the transistor normally conductive. The transistor is cut off by a positive-going impulse transmitted to the base, thereby changing the collector potential in a negative-going sense, which change is transmitted to an output terminal.

Between the input terminal and the base there may be provided an impedance coupling including either a resistor, a capacitor, or a parallel resistor and capacitor. Alternatively, a direct conductive coupling may be used. For many purposes, it is preferred to use the parallel resistor and capacitor input coupling.

A clamping circuit is provided for the collector electrode, to establish the negative peak value of the output pulses.

Other objects and advantages of the invention will become apparent from a consideration of the following specification and claims, taken together with the accompanying drawings.

FIGS. 1 TO 3

Figure 1:
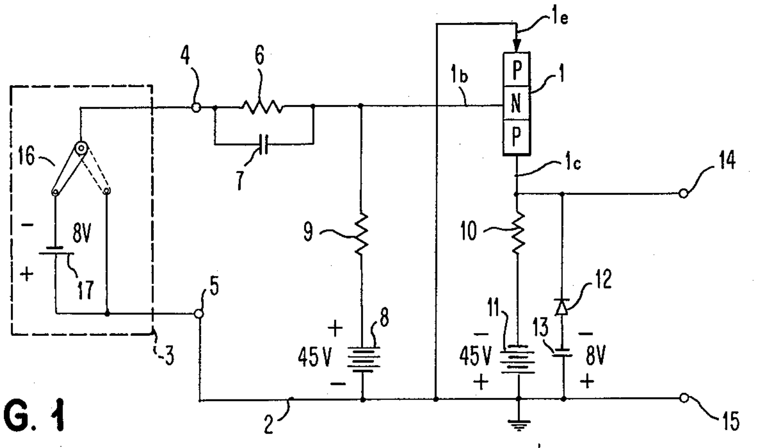
FIG. 1 is a wiring diagram of an inverter circuit used in the invention.

FIG. 1 illustrates an inverter circuit including a PNP junction transistor 1, having an emitter electrode 1*e*, a base electrode 1*b*, and a collector electrode 1*c*. Emitter 1*e* is connected to a grounded wire 2. An input signal generator 3 is connected to a pair of input terminals 4 and 5. Input terminal 4 is connected through a resistor 6 and a parallel capacitor 7 to the base electrode 1*b*. Input terminal 5 is connected to grounded wire 2.

Means for biasing the base electrode 1*b* positively is provided, including a battery 8 and a resistor 9 connected in series between grounded wire 2 and base 1*b*. Collector 1*c* is connected to a load circuit including a load resistor 10 and a battery 11 in series, the opposite terminal of battery 11 being connected to grounded wire 2.

A clamping circuit is provided for limiting the minimum negative potential of collector 1*c*. This clamping circuit comprises a diode 12 and a battery 13 connected in series between collector electrode 1*c* and grounded wire 2.

A pair of output terminals 14 and 15 are connected respectively to collector 1*c* and to grounded wire 2.

Figure 2:
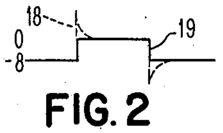
FIGS. 2 and 3 are graphical illustrations of the current and potential waves occurring at different points in the circuits of FIGS. 1 and 1A.

The signal generator 3 may have any conventional form. In order to illustrate an example, it is shown very simply as comprising a switch 16 movable between the full-line position shown, in which a battery 17 is connected in series between the input terminals 4 and 5, and a dotted-line position in which the input terminals 4 and 5 are directly connected together. Operation of switch 16 from its full-line position to its dotted-line position and return produces at the terminal 4 a square wave input signal illustrated graphically at 19 in FIG. 2.

Figure 1A:
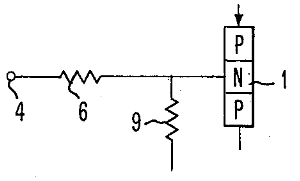
FIG. 1A is a fragmentary wiring diagram showing a modification of a portion of the circuit of FIG. 1.

FIG. 1A illustrates a possible modification of FIG. 1, that modification consisting simply of omitting the capacitor 7.

OPERATION OF FIGS. 1 TO 3

When the switch 16 in signal generator 3 is in the position shown, the base electrode *1b* is maintained at a negative potential by the combined effects of batteries 8, 11 and 17. The emitter electrode *1e* is connected to ground, and is therefore continuously at a potential of 0 volts. The emitter being positive with respect to the base *1b*, the transistor 1 is conductive, so that a substantial current flows in the load circuit of the transistor. The potential of the collector electrode is below ground only by the potential drop through the transistor, which at this time is very small, so that the collector electrode is at a negative potential of a few tenths of a volt, which may be for practical purposes considered as 0 volts. A substantial current also flows through the base electrode *1b* producing a potential drop across current limiting resistor 6, which potential drop is effective to charge the capacitor 7 with its right hand terminal positive. This potential drop across resistor 6 must be less than the terminal voltage of battery 17, i.e., in the illustrated example, 8 volts since base *1b* is to be held negative.

Figure 3:
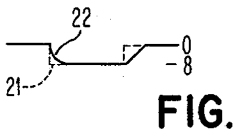

Now assume that the signal generator 3 transmits a positive-going square wave pulse to the base *1b*. In the arrangement shown for the signal generator 3, this is accomplished by throwing the switch 16 to its dotted-line position. When this positive-going square wave is first impressed across terminals 4 and 5, it adds in series with the potential due to the charge on capacitor 7. The potential at the base *1b* is therefore suddenly increased, following the curve 18 appearing in dotted lines in FIGURE 2 and the base swings positive. The high positive potential applied to base *1b* swings it above the potential of the emitter *1e*, thereby cutting off the flow of current in the transistor 1. The flow of current through resistor 6 stops, and the charge across the capacitor 7 leaks off through resistor 6, the potential of base *1b* falling substantially to the potential of input terminal 4, which is indicated by the curve 19 in FIG. 2. When the current flow in transistor 1 cuts off, the collector electrode *1c* then swings negatively, tending to assume the potential of the negative terminal of battery 11. The negative swing of collector *1c* is, however, limited by the clamping diode 12 and the battery 13. The diode 12 starts to conduct in its forward direction as soon as the collector *1c* falls to a potential of −8 volts, thereby limiting the negative swing of the potential of the collector electrode to that value. The output signal has the form and potential values indicated by the curve 21 in FIG. 3.

When the input signal pulse terminates, for example by returning the switch 16 to its full-line position, the capacitor 7 has no charge and acts as a low impedance between base *1b* and the negative battery terminal, thereby swinging the base electrode *1b* negative rapidly and turning the transistor on quickly, whereupon the conditions in the circuit return to the status first described above.

The bias to the base *1b* provided by battery 8 and resistor 9 result in improved operation of the circuit at elevated temperatures. Such temperatures tend to increase the Off state collector current, and this tendency is counteracted by the bias, making the circuit less sensitive to temperature.

If the capacitor 7 is omitted, as indicated in FIG. 1A, then the transistor does not cut off or turn on as quickly as when the capacitor is used. The output wave then has the form illustrated at 22 in FIG. 3, having a gradual beginning and ending instead of a vertical square beginning and ending. The full lines in FIGS. 2 and 3 respectively show the input signal and the output signal when capacitor 7 is used, and the dotted lines in those figures respectively show the base and collector (output) potentials when capacitor 7 is not used.

It may therefore be seen that the circuit of FIG. 1 inverts signals supplied by the signal generator 3, reversing the polarity of the potentials of the input signals, while maintaining their wave form the same as that of the input signals and establishing the maximum value of the output signal at a fixed predetermined point. If the wave form is not important, the capacitor 7 may be omitted as in FIG. 1A.

FIG. 4

This figure illustrates an inverter circuit which may be used with capacity input coupling, in which case it changes a square wave input pulse to a peaked wave output, or it may be used with direct input coupling, in which case it inverts the input signal. The circuit includes a PNP junction transistor 31 having an emitter electrode *31e*, a base electrode *31b*, and a collector electrode *31c*. The emitter electrode *31e* is connected to grounded wire 2. Base electrode *31b* is connected through resistor 9 and a biasing battery 8 to the grounded wire 2. Base *31b* is also connected through resistor 36 to grounded wire 2. Base *31b* is also connected through a capacitor 32 and a switch 33 to an input terminal 34. Alternatively, switch 33 may be thrown to the dotted line position shown, so that capacitor 32 is shunted by wire 39. Another input terminal 35 is connected to the grounded wire 2. Signal generator 3 is connected to the input terminals 34 and 35. An output circuit like that of FIG. 1 is connected between collector electrode *31c* and grounded wire 2.

OPERATION OF FIG. 4

Figure 4:
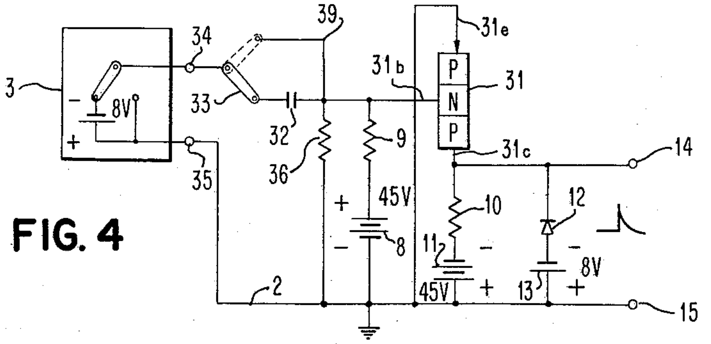
FIG. 4 is a wiring diagram of a modified inverter circuit.

Consider first the operation of the circuit of FIG. 4 which takes place with capacity input coupling, i.e., with the switch 33 in full-line position shown. Under no signal conditions, −8 volts is applied to the input terminal 34, and capacitor 32 becomes charged with a potential of substantially −8 volts, with its left hand terminal negative. The base *31b* is biased substantially to a potential of plus 1 volt, by the battery 8. The transistor is cut off.

When a signal appears at the input terminals 34 and 35, it swings the base potential *31b* farther positive, due to the potential stored on capacitor 32. However, this potential now leaks off through resistor 36, so that after a short time there is no potential across capacitor 32. When the input signal thereafter goes negative, it biases the base *31b* negative and a charging current for capacitor 32 flows through resistor 36. The base *31b* then falls to a potential below the ground potential of the emitter and the transistor conducts until the capacitor 32 is charged sufficiently to swing the base positive again. The rate of conduction through the transistor starts out at a high level because substantially the full negative voltage of the signal generator 3 is initially applied to the base. This voltage gradually drops to zero as the capacitor 32 charges. The current flow through transistor 31 therefore starts off at a high rate and gradually falls to zero.

Figure 4A:
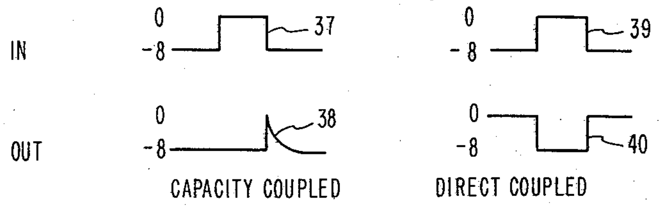
FIG. 4A is a graphical illustration of potential waves occurring at selected points in the circuit of FIG. 4.

FIG. 4A shows in curve 37 the wave form of the input signal and in curve 38 the wave form of the output signal. Curve 38 may have a flat top or "dwell" before falling, if the signal applied to the base is more than enough to drive the collector into "saturation." Then, the output will stay positive until the base current through capacitor 32 becomes small enough so that the transistor begins to return to the Off state. The duration of the flat top or dwell depends on the size of capacitor 32 and the current gain of the transistor.

The circuit of FIG. 4 arranged for capacitive input coupling, may be used effectively as an interstage coupling circuit for a ring circuit, as illustrated, for example in the patent to Olin L. MacSorley, U.S. 2,882,423, granted April 14, 1959, which was copending with the parent of the present application.

When the switch 33 is thrown to its dotted-line position, the capacitor 32 is shunted by a wire 39. In that case, the circuit responds directly to the input signals and is an inverter circuit. The input signal then has the form shown by the curve 39 in FIG. 4A and the output signal is as shown at 40.

Where PNP junction transistors are employed in the foregoing circuits, it will be readily understood that NPN junction transistors could be employed with equal facility by reversing the polarities of all batteries, and vice versa.

The following table shows by way of example particular values for the potentials of the various batteries and for the impedances of the various resistors and capacitors, in circuits which have been operated successfully. In some cases, these values are also shown in the drawing. These values are set forth by way of example, only, and the invention is not limited to these values nor to any of them. No values are given for the asymmetric impedance elements which may be considered to have substantially no impedance in their forward direction and substantially infinite impedance in their reverse direction.

*Table I*

| | |
|---|---|
| Resistor 6 | 20 kilohms. |
| Capacitor 7 | 680 mmf. |
| Battery 8 | +15 volts. |
| Resistor 9 | 240 kilohms. |
| Resistor 10 | 3 kilohms. |
| Battery 11 | −15 volts. |
| Battery 13 | −5 volts. |
| Battery 17 | −5 volts. |
| Capacitor 32 | 680 mmf. |
| Resistor 36 | 10 kilohms. |

What is claimed is:

1. An inverter circuit comprising a transistor having an emitter, a collector and a base, means directly connecting the emitter to a common junction having a fixed potential; a first source of direct electrical energy and a first resistor connected in series between the common junction and the base with the source poled to bias the base reversely with respect to the emitter; an input terminal, a second resistor and a capacitor connected in parallel between the input terminal and the base, the input terminal and the base serving as common terminals of the second resistor and the capacitor, signal input means connected between the input terminal and the common junction and shiftable between relatively negative and relatively positive signal conditions and effective in one only of said conditions to overcome the reverse bias of said first source; a load resistor and a second source of direct electrical energy connected in series between the collector and the common junction, said second source being poled to bias the collector reversely with respect to the base, a third source of direct electrical energy having one terminal connected to the common junction, a diode having a first electrode connected to the opposite terminal of the third source and a second electrode connected to the collector, said diode being poled to present its high impedance to current from the third source, said third source being poled with respect to the common junction in the same sense as the second source and having a potential substantially equal to the difference between the potentials corresponding to the two signal conditions of the signal input means, and an output terminal connected to the collector, said sources and said signal input means cooperating when the signal input means shifts from its relatively negative to its relatively positive condition to shift the collector electrode from a relatively positive to a relatively negative condition, thereby producing at the output terminal a signal inverted with respect to the input signal; said third source, said diode, and said transistor cooperating to limit the amplitude of the inverted signal to a value substantially equal to the difference between the potentials of the two signal conditions of the signal input means.

2. An inverter circuit comprising a transistor having an emitter, a collector and a base, means directly connecting the emitter to a common junction having a fixed potential; a first source of direct electrical energy and a first resistor connected in series between the common junction and the base with the source poled to bias the base reversely with respect to the emitter; a second resistor connected between the base and the common junction, an input terminal, a purely capacitive impedance connected between the input terminal and the base, signal input means connected between the input terminal and the common junction and shiftable between relatively negative and relatively positive signal conditions, said capacitive impedance and said signal input means cooperating only when the signal input means shifts in one sense between its two conditions to apply to the base a pulse signal effective to overcome the reverse bias of said first source; a load resistor and a second source of direct electrical energy connected in series between the collector and the common junction, said second source being poled to bias the collector reversely with respect to the base, a third source of direct electrial energy having one terminal connected to the common junction, a diode having a first electrode connected to the opposite terminal of the third source and a second electrode connected to the collector, said diode being poled to present its high impedance to current from the third source, said third source being poled with respect to the common junction in the same sense as the second source and having a potential substantially equal to the difference between the potentials corresponding to the two signal conditions of the signal input means, and an output terminal connected to the collector, said sources and said signal input means cooperating when said pulse signal is applied to the base to shift the collector electrode potential in the opposite sense, thereby producing at the output terminal a pulse signal inverted with respect to the base input pulse signal; said third source, said diode, and said transistor cooperating to limit the amplitude of the inverted signal to a value substantially equal to the difference between the potentials of the two signal conditions of the signal input means.

3. An inverter circuit comprising a transistor having an emitter, a collector and a base, means directly connecting the emitter to a common junction having a fixed potential; a first source of direct electrical energy and a first resistor connected in series between the common junction and the base with the source poled to bias the base reversely with respect to the emitter; a second resistor connected between the base and the common junction, an input terminal connected directly and conductively to the base, signal input means connected between the input terminal and the common junction and shiftable between relatively negative and relatively positive signal conditions and effective in one only of said conditions to overcome the reverse bias of said first source; and a load resistor and a second source of direct electrical energy connected in series between the collector and the common junction, said second source being poled to bias the collector reversely with respect to the base, a third source of direct electrical energy having one terminal connected to the common junction, a diode having a first electrode connected to the opposite terminal of the third course and a second electrode connected to the collector, said diode being poled to present its high impedance to current from the third source, said third source being poled with respect to the common junction in the same sense as the second source and having a potential substantially equal to the difference between the potentials corresponding to the two signal conditions of the signal input means, and an output terminal connected to the collector, said sources and said signal input means cooperating when the signal input means shifts from its relatively negative to its relatively positive condition to shift the collector electrode from a relatively positive to a relatively negative condition, thereby producing at the output terminal a signal inverted with respect to the input signal, said third source, said diode, and said transistor cooperating to limit the amplitude of the inverted signal to a value substantially equal to the difference between the potentials of the two signal conditions of the signal input means.

References Cited in the file of this patent

UNITED STATES PATENTS

| | | |
|---|---|---|
| 2,313,906 | Wendt | Mar. 16, 1943 |
| 2,579,336 | Rack | Dec. 18, 1951 |
| 2,591,961 | Moore | Apr. 8, 1952 |
| 2,644,897 | Lo | July 7, 1953 |
| 2,759,052 | MacDonald et al. | Aug. 14, 1956 |
| 2,778,978 | Drew | Jan. 22, 1957 |
| 2,853,630 | Lane | Sept. 23, 1958 |
| 2,878,398 | Peterson | Mar. 17, 1959 |

OTHER REFERENCES

Pub. 1, "Transistor Circuits," by Shea, Wiley 1953, page 51.

Pub. 2, "Waveforms," by Chance et al., McGraw-Hill 1949, pages 649, 164.